(12) United States Patent  
Fornander et al.

(10) Patent No.: US 9,348,514 B2  
(45) Date of Patent: *May 24, 2016

(54) EFFICIENCY SETS IN A DISTRIBUTED SYSTEM

(71) Applicant: SolidFire, Inc., Boulder, CO (US)

(72) Inventors: Mattias Fornander, Boulder, CO (US); Alyssa Proulx, Boulder, CO (US); Jared Cantwell, Boulder, CO (US); Travis Gockel, Boulder, CO (US)

(73) Assignee: NETAPP, INC., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/684,894

(22) Filed: Apr. 13, 2015

(65) Prior Publication Data

US 2015/0309746 A1  Oct. 29, 2015

Related U.S. Application Data

(63) Continuation of application No. 14/259,467, filed on Apr. 23, 2014.

(51) Int. Cl.  
*G06F 12/00* (2006.01)  
*G06F 3/06* (2006.01)

(52) U.S. Cl.  
CPC ............ *G06F 3/0608* (2013.01); *G06F 3/0619* (2013.01); *G06F 3/0641* (2013.01); *G06F 3/0665* (2013.01); *G06F 3/0689* (2013.01)

(58) Field of Classification Search  
None  
See application file for complete search history.

(56) References Cited

U.S. PATENT DOCUMENTS

| | | |
|---|---|---|
| 6,604,155 B1 | 8/2003 | Chong, Jr. |
| 7,382,637 B1 | 6/2008 | Rathnavelu et al. |
| 8,799,705 B2 | 8/2014 | Hallak et al. |
| 2003/0028642 A1 | 2/2003 | Agarwal et al. |
| 2004/0107281 A1 | 6/2004 | Bose et al. |
| 2004/0133622 A1 | 7/2004 | Clubb et al. |
| 2010/0205390 A1* | 8/2010 | Arakawa ................ 711/162 |
| 2011/0238857 A1 | 9/2011 | Certain et al. |
| 2011/0307530 A1* | 12/2011 | Patterson ................ 707/813 |
| 2012/0124282 A1 | 5/2012 | Frank et al. |
| 2012/0317353 A1 | 12/2012 | Webman et al. |
| 2012/0317395 A1 | 12/2012 | Segev et al. |
| 2013/0110766 A1* | 5/2013 | Promhouse et al. ......... 707/607 |
| 2013/0124776 A1 | 5/2013 | Hallak et al. |
| 2013/0173955 A1 | 7/2013 | Hallak et al. |

(Continued)

OTHER PUBLICATIONS

International Search Report and Written Opinion for Patent Application No. PCT/US15/24067 mailed Jul. 8, 2015, 7 pages.

(Continued)

*Primary Examiner* — Baboucarr Faal  
(74) *Attorney, Agent, or Firm* — Foley & Lardner LLP

(57) ABSTRACT

Disclosed are systems, computer-readable mediums, and methods for efficiency sets in a distributed system. A first efficiency set is determined for a first volume of data. Determining the first efficiency set includes selecting block identifiers for data blocks of the first volume, where each block identifier is used to access a particular data block corresponding to the first volume. Determining the first efficiency set further includes applying a mask to the selected block identifiers to mask at least one bit of each selected block identifier. The first efficiency set is compared to a second efficiency set for a second data store, and based on the comparison, an amount of unique data blocks of the first volume is approximated.

20 Claims, 6 Drawing Sheets

(56) References Cited

U.S. PATENT DOCUMENTS

2013/0305002 A1 11/2013 Hallak et al.
2014/0082273 A1 3/2014 Segev

OTHER PUBLICATIONS

Non-Final Office Action received in U.S. Appl. No. 14/259,467 mailed Jul. 31, 2015, 12 pages.

* cited by examiner

EFFICIENCY SETS IN A DISTRIBUTED SYSTEM

CROSS-REFERENCE TO RELATED APPLICATIONS

The present application is a continuation of U.S. patent application Ser. No. 14/259,467, filed Apr. 23, 2014, the entire contents of which are incorporated herein by reference in its entirety.

BACKGROUND

The following description is provided to assist the understanding of the reader. None of the information provided is admitted to be prior art.

In data storage architectures, a client's data may be stored in a volume. A unit of data, for example a file (or object), is comprised of one or more storage units (e.g. bytes) and can be stored and retrieved from a storage medium such as disk or RAM in a variety of fashions. For example, disk drives in storage systems are divided into logical blocks that are addressed using logical block addresses (LBAs). As another example, an entire file can be stored in a contiguous range of addresses on the storage medium and be accessed given the offset and length of the file. Most modern file systems store files by dividing them into blocks or extents of a fixed size, storing each block in a contiguous section of the storage medium, and then maintaining a list or tree of the blocks that correspond to each file. Some storage systems, such as write-anywhere file layout (WAFL), logical volume manager (LVM), or new technology file system (NTFS), allow multiple objects to refer to the same blocks, typically through a tree structure, to allow for efficient storage of previous versions or "snapshots" of the file system. In some cases, data for a single file or object may be distributed between multiple storage devices, either by a mechanism like RAID which combines several smaller storage media into one larger virtual device, or through a distributed storage system such as Lustre, General Parallel File System, or GlusterFS.

During operation, volumes of data may be moved between various clusters. For example, a volume may be moved for performance or other maintenance purposes. Additionally, new volumes of data may be added or imported to a storage system. However, the most efficient cluster on which to move an existing volume or on which to import a new volume needs to be determined by a system administrator.

BRIEF DESCRIPTION OF THE DRAWINGS

The foregoing and other features of the present disclosure will become more fully apparent from the following description and appended claims, taken in conjunction with the accompanying drawings.

DETAILED DESCRIPTION OF EXAMPLE EMBODIMENTS

Overview

Figure 1:
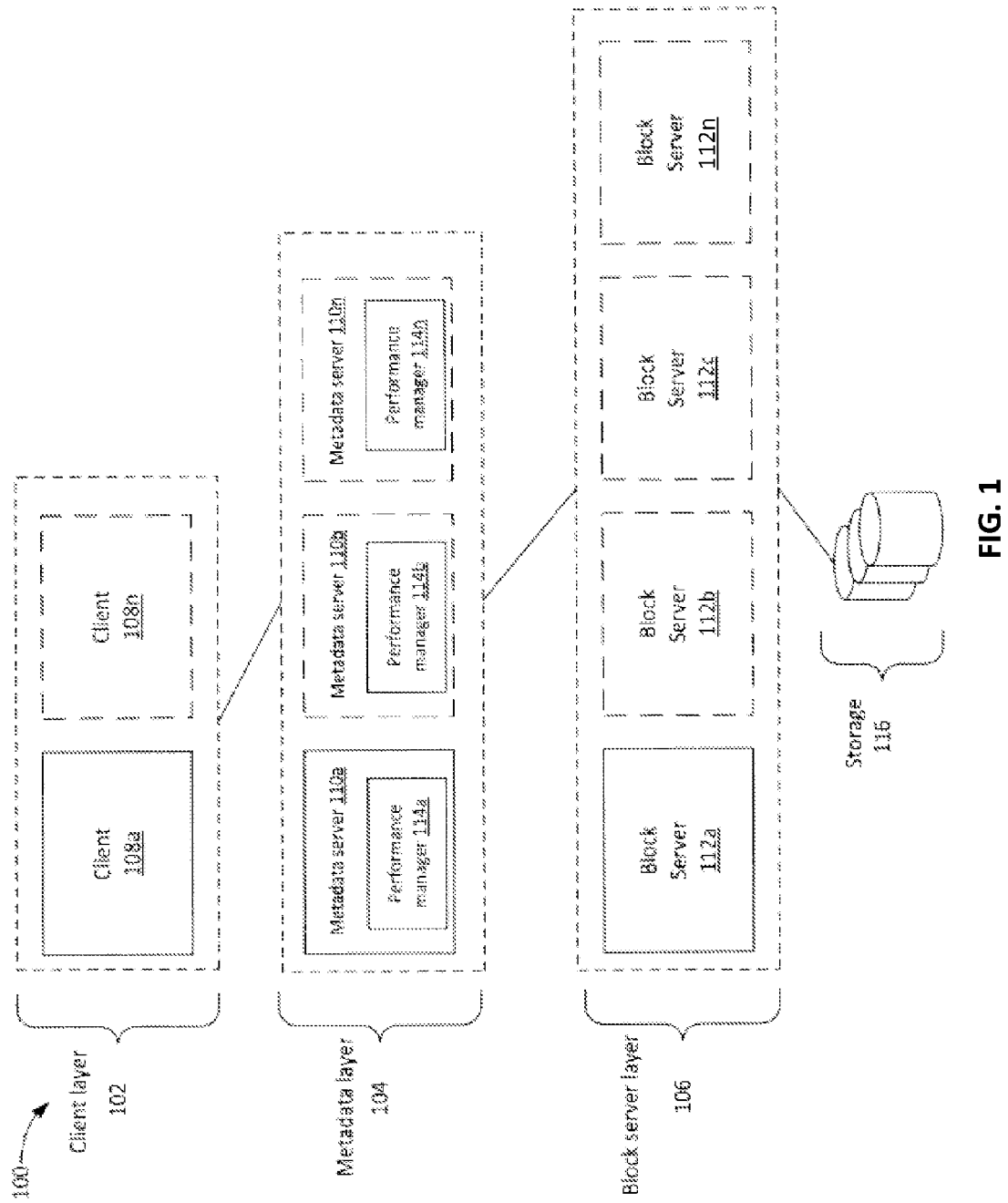
FIG. 1 depicts a distributed block level storage system 100 in accordance with an illustrative implementation.

In general, one innovative aspect of the subject matter described below can be embodied in a storage system comprising a server that has one or more processors. The one or more processors are configured to determine a first efficiency set for a first volume of data. To determine the first efficiency set the one or more processors are configured to select block identifiers for data blocks of the first volume, wherein each block identifier is used to access a particular data block corresponding to the first volume, and to apply a mask to the selected block identifiers to mask at least one bit of each selected block identifier. The one or more processors are further configured to compare the first efficiency set to a second efficiency set for a second data store, and to approximate, based on the comparison, an amount of unique data blocks of the first volume.

Another innovative aspect of the subject matter described below can be embodied in a method comprising determining a first efficiency set for a first volume of data of a storage system. Determining the first efficiency set comprises selecting block identifiers for data blocks of the first volume, wherein each block identifier is used to access a particular data block corresponding to the first volume, and applying a mask to the selected block identifiers to mask at least one bit of each selected block identifier. The method further comprises comparing the first efficiency set to a second efficiency set for a second data store, and approximating, based on the comparison, an amount of unique data blocks of the first volume.

Another innovative aspect of the subject matter described below can be embodied in a non-transitory computer-readable medium having instructions stored thereon, that when executed by a computing device cause the computing device to perform operations. The operations comprise determining a first efficiency set for a first volume of data of a storage system. Determining the first efficiency set comprises selecting block identifiers for data blocks of the first volume, wherein each block identifier is used to access a particular data block corresponding to the first volume, and applying a mask to the selected block identifiers to mask at least one bit of each selected block identifier. The operations further comprises comparing the first efficiency set to a second efficiency set for a second data store, and approximating, based on the comparison, an amount of unique data blocks of the first volume.

The foregoing summary is illustrative only and is not intended to be in any way limiting. In addition to the illustrative aspects, implementations, and features described above, further aspects, implementations, and features will become apparent by reference to the following drawings and the detailed description.

DETAILED DESCRIPTION

Described herein are techniques for an incremental block level backup system. In the following description, for purposes of explanation, numerous examples and specific details are set forth in order to provide a thorough understanding of various implementations. Particular implementations as defined by the claims may include some or all of the features in these examples alone or in combination with other features described below, and may further include modifications and equivalents of the features and concepts described herein.

Storage System

FIG. 1 depicts a simplified system for a distributed block level storage system 100 in accordance with an illustrative implementation. System 100 includes a client layer 102, a metadata layer 104, a block server layer 106, and storage 116.

In general, client layer 102 includes one or more clients 108a-108n. Clients 108 include client processes that may exist on one or more physical machines. When the term "client" is used in the disclosure, the action being performed may be performed by a client process. A client process is responsible for storing, retrieving, and deleting data in system 100. A client process may address pieces of data depending on the nature of the storage system and the format of the data stored. For example, the client process may reference data using a client address. The client address may take different forms. For example, in a storage system that uses file storage, client 108 may reference a particular volume or partition, and a file name. With object storage, the client address may be a unique object name. For block storage, the client address may be a volume or partition, and a block address. Clients 108 communicate with metadata layer 104 using different protocols, such as small computer system interface (SCSI), Internet small computer system interface (ISCSI), fibre channel (FC), common Internet file system (CIFS), network file system (NFS), hypertext transfer protocol (HTTP), hypertext transfer protocol secure (HTTPS), web-based distributed authoring and versioning (WebDAV), or a custom protocol.

Metadata layer 104 includes one or more metadata servers 110a-110n. Performance managers 114 may be located on metadata servers 110a-110n. Block server layer 106 includes one or more block servers 112a-112n. Block servers 112a-112n are coupled to storage 116, which stores volume data for clients 108. Each client 108 may be associated with a volume. In one implementation, only one client 108 accesses data in a volume; however, multiple clients 108 may access data in a single volume. Multiple volumes from multiple users can be combined on a single storage system to form a cluster of volumes.

Storage 116 can include multiple solid state drives (SSDs). In one implementation, storage 116 can be a group of individual drives coupled together via a network. In one implementation, storage 116 uses solid state memory to store persistent data. SSDs use microchips that store data in non-volatile memory chips and contain no moving parts. One consequence of this is that SSDs allow random access to data in different drives in an optimized manner as compared to drives with spinning disks. Read or write requests to non-sequential portions of SSDs can be performed in a comparable amount of time as compared to sequential read or write requests. In contrast, if spinning disks were used, random read/writes would not be efficient since inserting a read/write head at various random locations to read data results in slower data access than if the data is read from sequential locations. Accordingly, using electromechanical disk storage can require that a client's volume of data be concentrated in a small relatively sequential portion of the cluster to avoid slower data access to non-sequential data. Using SSDs removes this limitation.

In various implementations, non-sequentially storing data in storage 116 is based upon breaking data up into one or more storage units, e.g., data blocks. A data block, therefore, is the raw data for a volume and may be the smallest addressable unit of data. The metadata layer 104 or the client layer 102 can break data into data blocks. The data blocks can then be stored on multiple block servers 112. Data blocks can be of a fixed size, can be initially a fixed size but compressed, or can be of a variable size. Data blocks can also be segmented based on the contextual content of the block. For example, data of a particular type may have a larger data block size compared to other types of data. Maintaining segmentation of the blocks on a write (and corresponding re-assembly on a read) may occur in client layer 102 and/or metadata layer 104. Also, compression may occur in client layer 102, metadata layer 104, and/or block server layer 106.

In addition to storing data non-sequentially, data blocks can be stored to achieve substantially even distribution across the storage system. In various examples, even distribution can be based upon a unique block identifier. A block identifier can be an identifier that is determined based on the content of the data block, such as by a hash of the content. The block identifier is unique to that block of data. For example, blocks with the same content have the same block identifier, but blocks with different content have different block identifiers. To achieve even distribution, the values of possible unique identifiers can have a uniform distribution. Accordingly, storing data blocks based upon the unique identifier, or a portion of the unique identifier, results in the data being stored substantially evenly across drives in the cluster. Furthermore, data may be deduplicated in a cluster based on the block identifiers. For example, if a first client and second client each store the same data, the stored data can have the same block identifier (as the block identifier is unique based on the content of the data block). As a result, that particular data block need only be stored once in a cluster of storage 116, as opposed to storing the data block separately for both the first and second client. Thus, the amount of storage 116 in use can be reduced by storing only unique data blocks. One effect of dedupability of data is that the unique storage space used by a volume compared to other volumes in a cluster cannot be determined from the size of the volume. This is because a volume may share its data with another volume in the cluster, such that when the volume is deleted the data that is shared will still remain in the cluster and available to the other volume.

Because client data stored on block servers, e.g., a volume associated with the client, is spread evenly across all of the drives in the cluster, every drive in the cluster is involved in the read and write paths of each volume. This configuration balances the data and load across all of the drives. This arrangement also removes hot spots within the cluster, which can occur when client's data is stored sequentially on any volume.

In addition, having data spread evenly across drives in the cluster allows a consistent total aggregate performance of a cluster to be defined and achieved. This aggregation can be achieved, since data for each client is spread evenly through the drives. Accordingly, a client's I/O will involve all the drives in the cluster. Since, all clients have their data spread substantially evenly through all the drives in the storage system, a performance of the system can be described in aggregate as a single number, e.g., the sum of performance of all the drives in the storage system.

Block servers 112 and metadata servers maintain a mapping between a block identifier and the location of the data block in a storage medium of block server 112. A volume includes these unique and uniformly random identifiers, and so a volume's data is also evenly distributed throughout the cluster.

Metadata layer 104 stores metadata that maps between client layer 102 and block server layer 106. For example, metadata servers 110 map between the client addressing used by clients 108 (e.g., file names, object names, block numbers, etc.) and block layer addressing (e.g., block identifiers) used in block server layer 106. In one embodiment, the metadata includes a list of block identifiers that identifies blocks in a volume. The list may be structured as an ordered list corresponding to a list of blocks. The list may also be structured as the leaves of a hash tree. The block identifiers of the metadata are the same block identifiers as used throughout system 100 as described herein. Additional metadata may also be included, such as inode numbers, directory pointers, modification dates, file size, client addresses, list details, etc. The block identifiers uniquely identify the data of a block and are a hash based on the content of the data block. Clients 108 may perform access based on client addresses. However, as described above, block servers 112 store data based upon identifiers and do not store data based on client addresses. Accordingly, a client can access data using a client address which is eventually translated into the corresponding unique identifiers that reference the client's data in storage 116.

Although the parts of system 100 are shown as being logically separate, entities may be combined in different fashions. For example, the functions of any of the layers may be combined into a single process or single machine (e.g., a computing device) and multiple functions or all functions may exist on one machine or across multiple machines. Also, when operating across multiple machines, the machines may communicate using a network interface, such as a local area network (LAN) or a wide area network (WAN). In one implementation, one or more metadata servers 110 may be combined with one or more block servers 112 in a single machine. Entities in system 100 may be virtualized entities. For example, multiple virtual block servers 112 may be included on a machine. Entities may also be included in a cluster, where computing resources of the cluster are virtualized such that the computing resources appear as a single entity.

Efficiency Sets

As noted above, the unique data stored in a volume compared to other volumes in a cluster cannot be determined from the size of the volume. To calculate the precise amount of unique data in a volume of a cluster requires determining for each block identifier of the volume, if the block identifier is used in any other volume in the cluster. Given the number and size of block identifiers, the time and memory required to calculate this number is not feasible. As described in greater detail below, efficiency sets can be used to estimate the uniqueness of a volume's data compared with other volumes of data. One use of efficiency sets is to calculate an estimate of an amount of unique data that would be freed up if the volume was removed from the cluster. Other applications of efficiency sets are described below.

One or more servers of a volume (e.g., servers of metadata layer 104, block server layer 106, etc.) can be configured to generate sets of masked block identifiers that correspond to the data blocks of the volume. These efficiency sets can be used to decrease computation time of various operations, such as estimating the uniqueness of a volume of data, or determining on what cluster to import a new volume of data. Each block identifier for a block of volume data can be obtained, masked (e.g., via a bitwise OR operation, a bitwise AND operation, changing a bit to become a "0" or "1", or otherwise), and form an efficiency set for a volume, as will be described further below. In one embodiment, one or more bits of a block identifier are masked to a binary "0". In another embodiment, one or more bits of a block identifier are masked to a binary "1". In another embodiment, whether one or more particular bits are masked to be "0" or "1" is random and independent of a mask applied to other bits. For example, a random seed may be used to generate a random number on which an entire bitmask is based, or it may be used to randomly determine whether a particular bit is masked to become a "0" or "1". In one embodiment, the amount of bits to be masked in order to generate an efficiency set is increased iteratively until a desired memory storage requirement and/or computation requirement is met. For example, the size of a bitmask (i.e., the number of bits being masked or the order of the bitmask) may be increased until a resulting efficiency set only requires a certain amount of memory space or computational resources to further process. Thus, each volume can have a corresponding efficiency set based on its block identifiers and an applied mask. Additionally, efficiency sets can be generated from block identifiers corresponding to multiple volumes of a cluster of data or the block identifiers of an entire cluster. By creating and maintaining such efficiency sets, multiple volumes (or clusters) of data may be quickly compared to estimate amounts of unique data. In an illustrative implementation, the dedupability of block data between two or more volumes can be quickly approximated. For example, a first efficiency set of a first volume (ES1) can be compared to a second a second efficiency set of a second volume (ES2) to estimate the amount of unique blocks stored by the first and second volumes, which can be based on the amount of duplicate entries between efficiency sets ES1 and ES2. A confidence level of such an estimation may be determined based on the size and type of mask applied to the block identifiers when forming the efficiency sets. The above metrics may then be used to approximate the effect of data between servers for optimization or maintenance purposes. Additionally, by masking the block identifiers, the memory footprint required to calculate these metrics is reduced as compared to if unmasked block identifiers were used in such calculations. This is because after the application of the mask, duplicate entries of masked block identifiers can be removed from an efficiency set, and the number of entries in an efficiency set for a volume (or cluster) will generally be less than the amount of unmasked block identifiers for the same volume (or cluster).

Figure 2A:
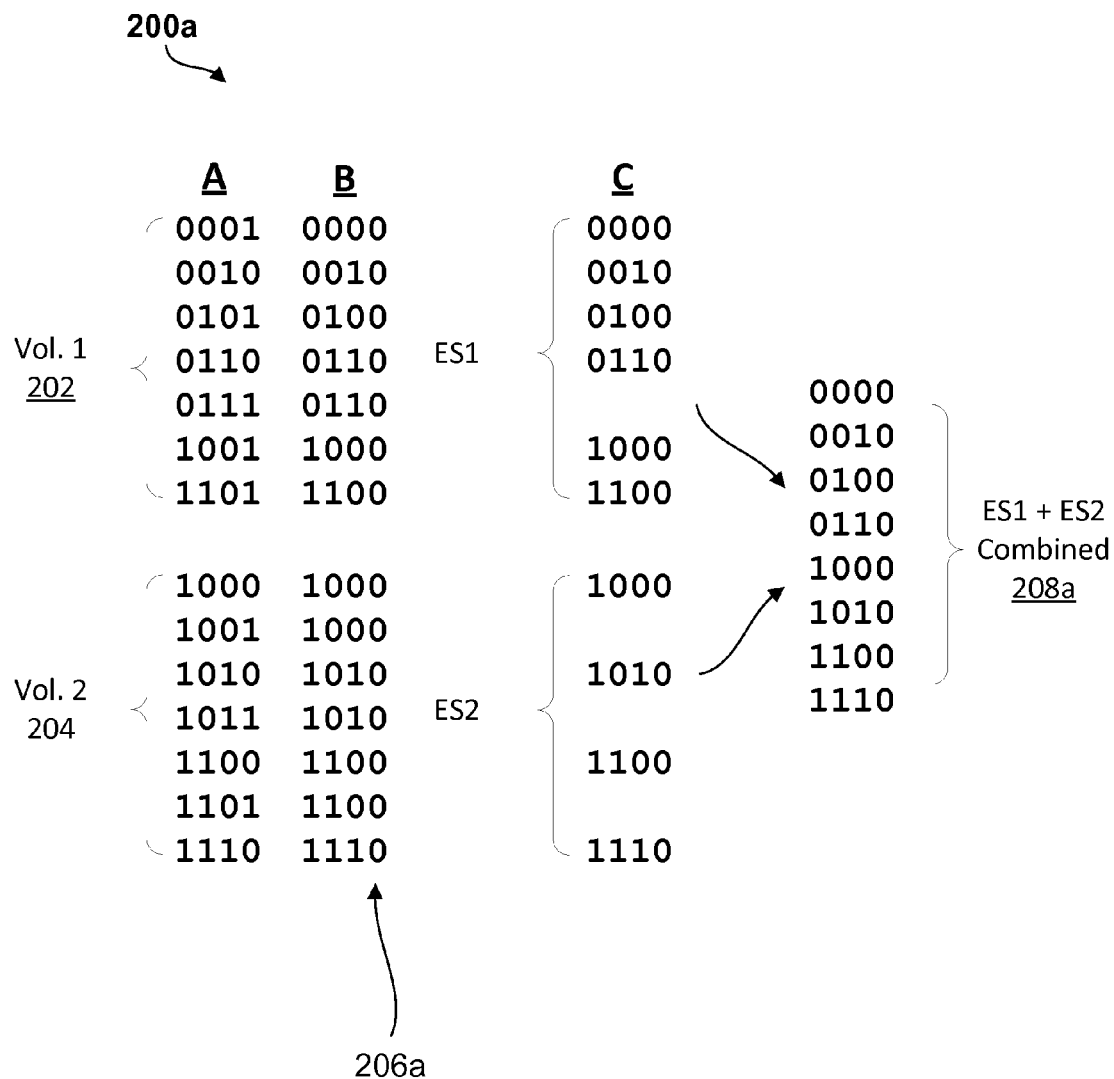
FIG. 2A depicts efficiency sets in accordance with an illustrative implementation.

Referring to FIG. 2A, a diagram 200*a* of sample efficiency sets (ES1 and ES2) is shown in accordance with an illustrative implementation. Efficiency sets ES1 and ES2 are generated from groups of block identifiers 202 and 204 of a first and second volume, respectively. For explanatory purposes, block identifiers are shown as 4-digit binary numbers. However, any of the block identifiers as described herein may be utilized. Accordingly, in column A, the sets of block identifiers 202 and 204 each consist of the block identifiers for the corresponding volume. In other words, the block identifiers of group 202 correspond to the data blocks of the first volume. The block identifiers of group 204 correspond to the data blocks of the second volume. In column B, a bitmask 206*a* has been applied to block identifier groups 202 and 204 such that the least significant bit of the block identifiers is masked to become "0" (i.e., a bitwise AND of the value "0" has been applied to the first digit of each identifier). It should be understood that the scope of the present disclosure is not limited to a particular type of mask to be applied to groups of block identifiers. For example, any one of the bits of the binary representation of a block identifier may be masked to be set on or off, and multiple bits may be masked at the same time. In an illustrative implementation, the type of mask to be applied may be selected based on the desired probability of accuracy (e.g., confidence) an administrator requires in a resulting efficiency set and in calculations using the efficiency set. For example, as more bits are masked, the effective level of precision of the bit identifiers is reduced, and the probability that the group of masked bit identifiers is an accurate representation of volume data is reduced.

After bitmask 206a has been applied, the resulting efficiency sets ES1 and ES2 may be seen with reference to column C. As depicted, the application of bitmask 206a to block identifiers group 202 resulted in a reduced set of masked identifiers as compared to the entire group of block identifiers. For example, block identifier "0111" of group 202 was masked to become "0110," which was a duplicate entry in group 202, column B. As a result, the efficiency set ES1 only needs to store "0110" once, and the duplicate entry of "0110" may be removed. Because of this, the memory footprint required to store efficiency set ES1 is less than that of block identifier group 202, because less entries are stored (i.e., six entries in efficiency set ES1 of volume 1 as compared to seven entries in block identifier group 202 for volume 1). Also as shown, bitmask 206a can also be applied to block identifier group 204 (i.e. the block identifiers corresponding to the second volume). As a result of bitmask 206a, efficiency set ES2 is formed for the second volume, which consists of four entries, as compared to seven entries in group 204.

After creating efficiency sets ES1 and ES2, these efficiency sets can be compared to approximate the dedupability (i.e. uniqueness) of data between volumes 1 and 2. Due to the application of bitmask 206a, a performance gain is realized (and memory footprint is reduced) as there are less overall values to be compared between efficiency sets ES1 and ES2 (as opposed to comparing all the block identifiers of groups 202 and 204 for volumes 1 and 2). As indicated by combined set 208a, there are eight unique masked block identifiers between ES1 and ES2, and there are ten total identifiers stored between ES1 and ES2. Thus, there are only two values ("1000" and "1100") that overlap between ES1 and ES2. This comparison indicates with a certain confidence score based on bitmask 206a and the format of the block identifiers, that there is a fair amount of unique data (i.e. not significant dedupability) between volumes 1 and 2. Accordingly, it can be estimated that if volumes 1 and 2 were to be stored on the same cluster, that there would be only minimal deduplication of data, as the majority of data blocks of volumes 1 and 2 are unique. For example, an administrator may perform such an estimation as he is maintaining the storage system. As another example, the storage system may automatically perform such an estimation as data is moved throughout the storage system (e.g., when a volume is imported or moved on to a cluster, etc.).

In one implementation, the mask used by an efficiency set is dynamically generated in a known way. Because application of the mask to block identifiers is lossy, the smallest mask required to meet memory and/or computation parameters can be preferred. In one implementation, a maximum number of block identifiers that can be stored in an efficiency set is determined. For example, an administrator can indicate that the efficiency set should be no larger than a certain amount of memory. From this value, the number of block identifiers that can be stored in the efficiency set can be determined. Initially, no mask is needed. As block identifiers are added to the efficiency set, the size of the efficiency set can be determined. If the size has reached its maximum size or is close to its maximum size, the mask can be increased to mask more bits. For example, initially a mask of 10 bits can be used. When the efficiency set has reached its maximum size, the mask can be increased to 11 bits, 12 bits, 15 bits, etc. Once the mask has been increased, the mask can be reapplied to the block identifiers already stored in the efficiency set and masked with the previous mask. By applying the new mask, previously stored block identifiers may be combined into a single entry in the efficiency set based upon the application of the new mask. This process can continue until all of the blocks of a volume have been processed. Once the efficiency set is created, information regarding the mask can be stored. For example, the number of masked bits can be stored and/or the mask itself can be stored.

Before two efficiency sets can be compared, the efficiency sets must be masked in the same way. Accordingly, in various embodiments mask generation is determinative, such that masks of the same size will be identical. When two efficiency sets have been generated using two differently sized masks, the larger mask, e.g., the mask that masks the most bits, can be reapplied to the efficiency set created with a smaller mask to create a new efficiency set. The efficiency set with the larger mask can then be compared with the new efficiency set, since they are now using the same mask. The new efficiency set can be generated directly from the original efficiency set with the smaller mask without the need of recreating a new efficiency set from the block identifiers of the storage unit. This is because any larger mask will mask the exact same bits as the smaller mask. Masking additional bits, therefore, can be done to the efficiency set itself rather than the reading the original block identifiers from the metadata. Applying a larger mask to this efficiency set, therefore, is similar to increasing the mask size during the generation of the efficiency set.

Figure 2B:
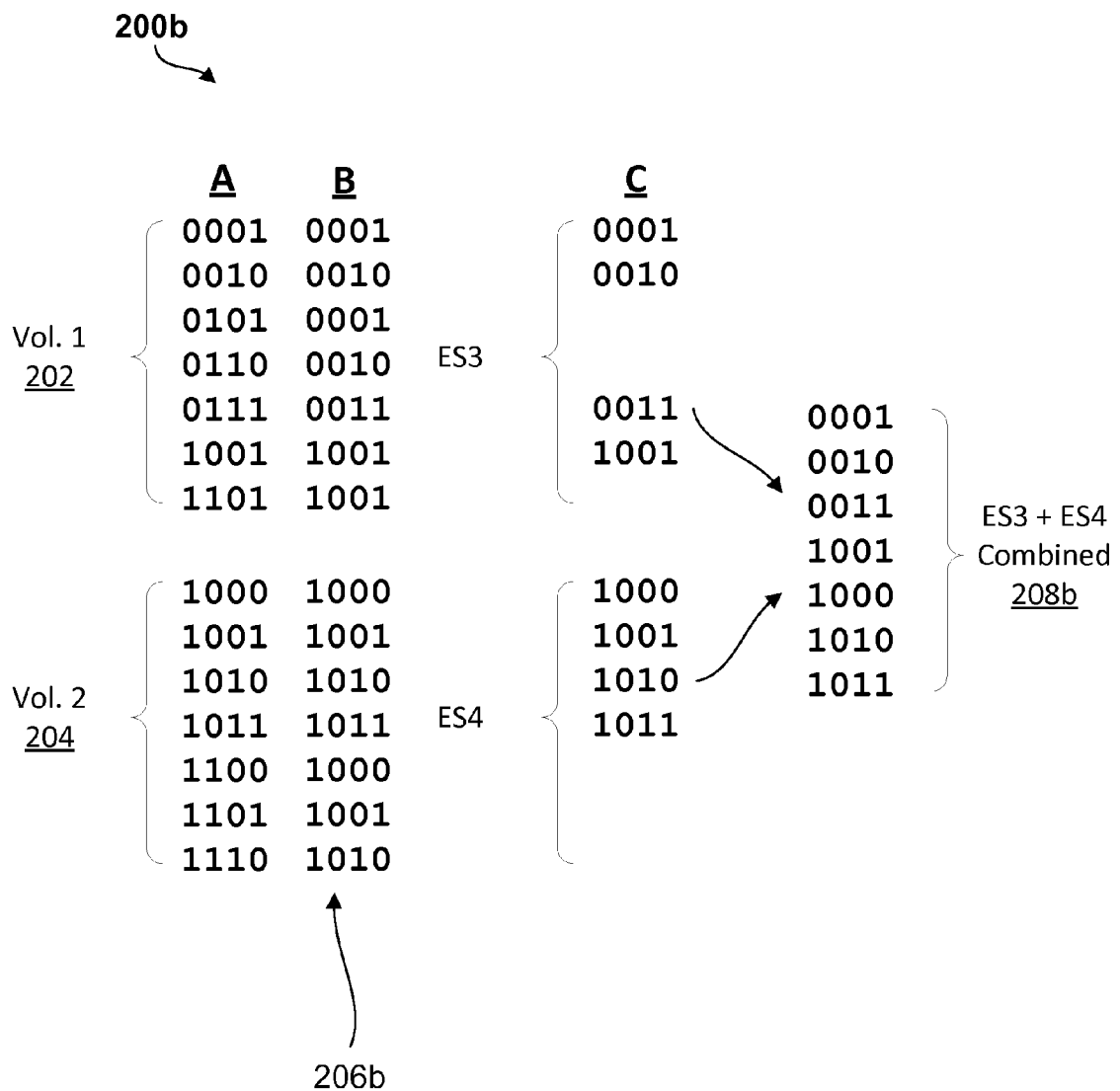
FIG. 2B depicts efficiency sets in accordance with an illustrative implementation.

Referring to FIG. 2B, a diagram 200b of sample efficiency sets (ES3 and ES4) is shown in accordance with an illustrative implementation. Efficiency sets ES3 and ES4 are generated from groups of block identifiers 202 and 204 of a first and second volume, respectively. In column A, the sets of block identifiers 202 and 204 each consist of all of the block identifiers for the corresponding volume. The block identifiers of group 202 identify the data blocks of the first volume. The block identifiers of group 204 identify the data blocks of the second volume. In column B, a bitmask 206b has been applied to block identifier groups 202 and 204 such that the third least significant bit of the block identifiers is masked to become "0". As compared to bitmask 206a, bitmask 206b has been applied to a different digit position of the block identifiers. In an illustrative implementation, the location at which to apply a bitmask can be specified by an administrator or via configuration settings. After bitmask 206b has been applied, the resulting efficiency sets ES3 and ES4 may be seen with reference to column C. As depicted, the application of bitmask 206b to block identifiers group 202 resulted in a reduced set of masked identifiers as compared to the entire group of block identifiers (i.e., four entries in efficiency set ES3 as compared to seven entries in group 202, and four entries in efficiency set ES4 as compared to seven entries in group 204).

After creating efficiency sets ES3 and ES4 for volumes 1 and 2, respectively, the efficiency sets can be compared to approximate the dedupability (i.e. uniqueness) of data between volumes 1 and 2 or to perform other calculations. Combined set 208b (e.g., the result of the comparison of ES3 and ES4) can be analyzed to approximate the uniqueness of volumes 1 and 2 as compared to each other.

Figure 2C:
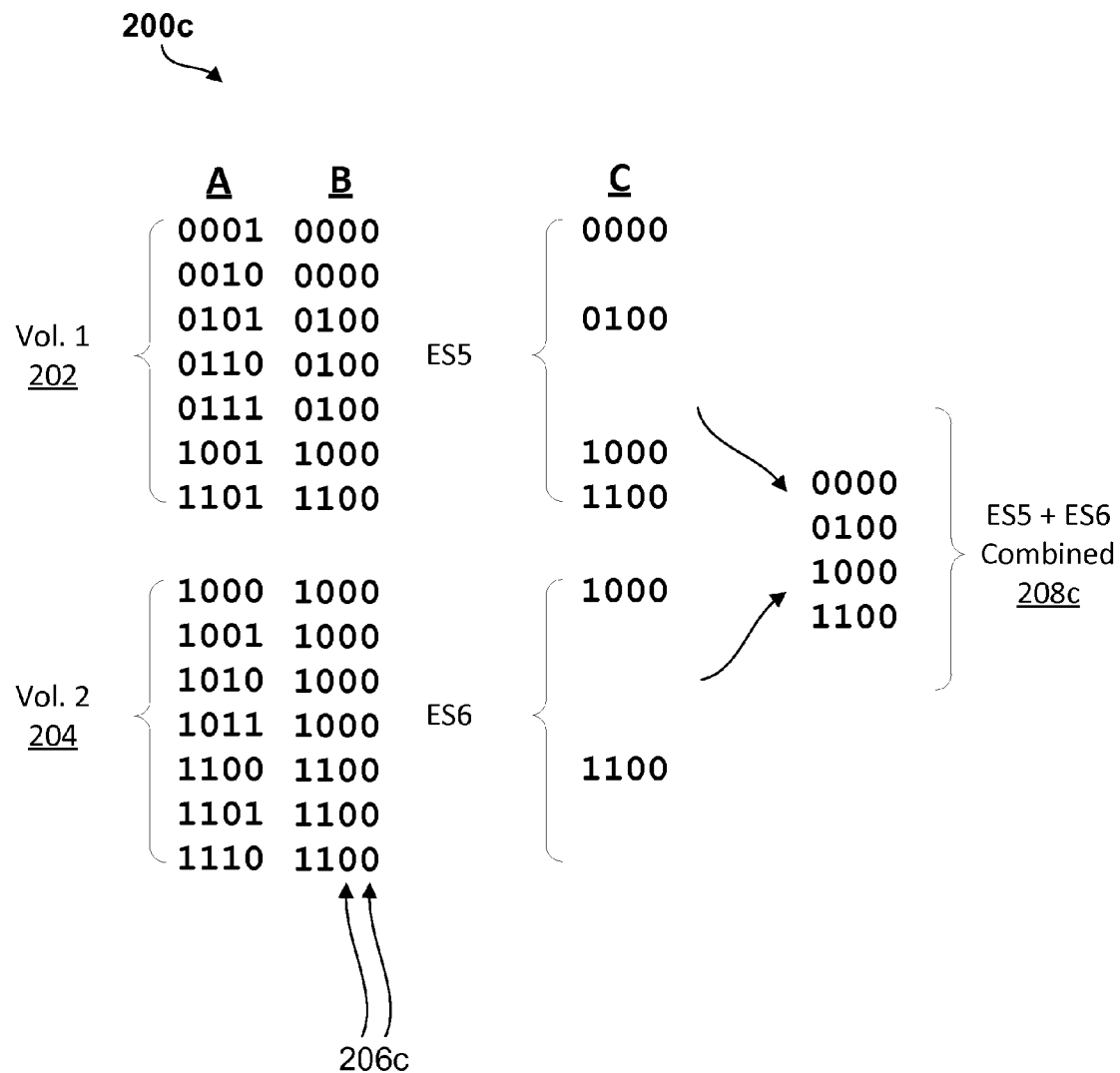
FIG. 2C depicts efficiency sets in accordance with an illustrative implementation.

Referring to FIG. 2C, a diagram 200c of sample efficiency sets (ES5 and ES6) is shown in accordance with an illustrative implementation. Efficiency sets ES5 and ES6 are generated from groups of block identifiers 202 and 204 of a first and second volume, respectively. In column A, the sets of block identifiers 202 and 204 each consist of the block identifiers for the corresponding volume. The block identifiers of group 202 correspond to the data blocks of the first volume. The block identifiers of group 204 correspond to the data blocks of the second volume. In column B, a bitmask 206c has been applied to block identifier groups 202 and 204 such that the first and second bits of the block identifiers are masked to become "00". As compared to bitmasks 206a and 206b, bitmask 206c masks a plurality of digits. Bitmask 206c may consist of any number of bits to be masked at any digit position. For example, bitmask 206c can mask the first and third digits of a block identifier. As another example, bitmask 206c can mask the highest order digit, the lowest order digit, and a middle ordered digit of a block identifier. After bitmask 206c has been applied, the resulting efficiency sets ES5 and ES6 may be seen with reference to column C. As depicted, the application of bitmask 206c to block identifiers group 202 results in four entries in efficiency set ES5 and two entries in efficiency set ES6. As discussed above, efficiency sets ES5 and ES6 can be compared to approximate the dedupability (i.e. uniqueness) of data between volumes 1 and 2 or to perform other calculations. However, as more bits were masked as compared to the application of bitmask 206a or 206b, the precision of efficiency sets ES5 and ES6 has decreased (i.e., how accurately ES5 and ES6 represent the sets of bit identifiers of groups 202 and 204, respectively). The combined set 208c may still be used in any of the analysis discussed herein, although the approximations made based on ES5 or ES6 have a probability of accuracy that reflects the decreased precision used.

Figure 2D:
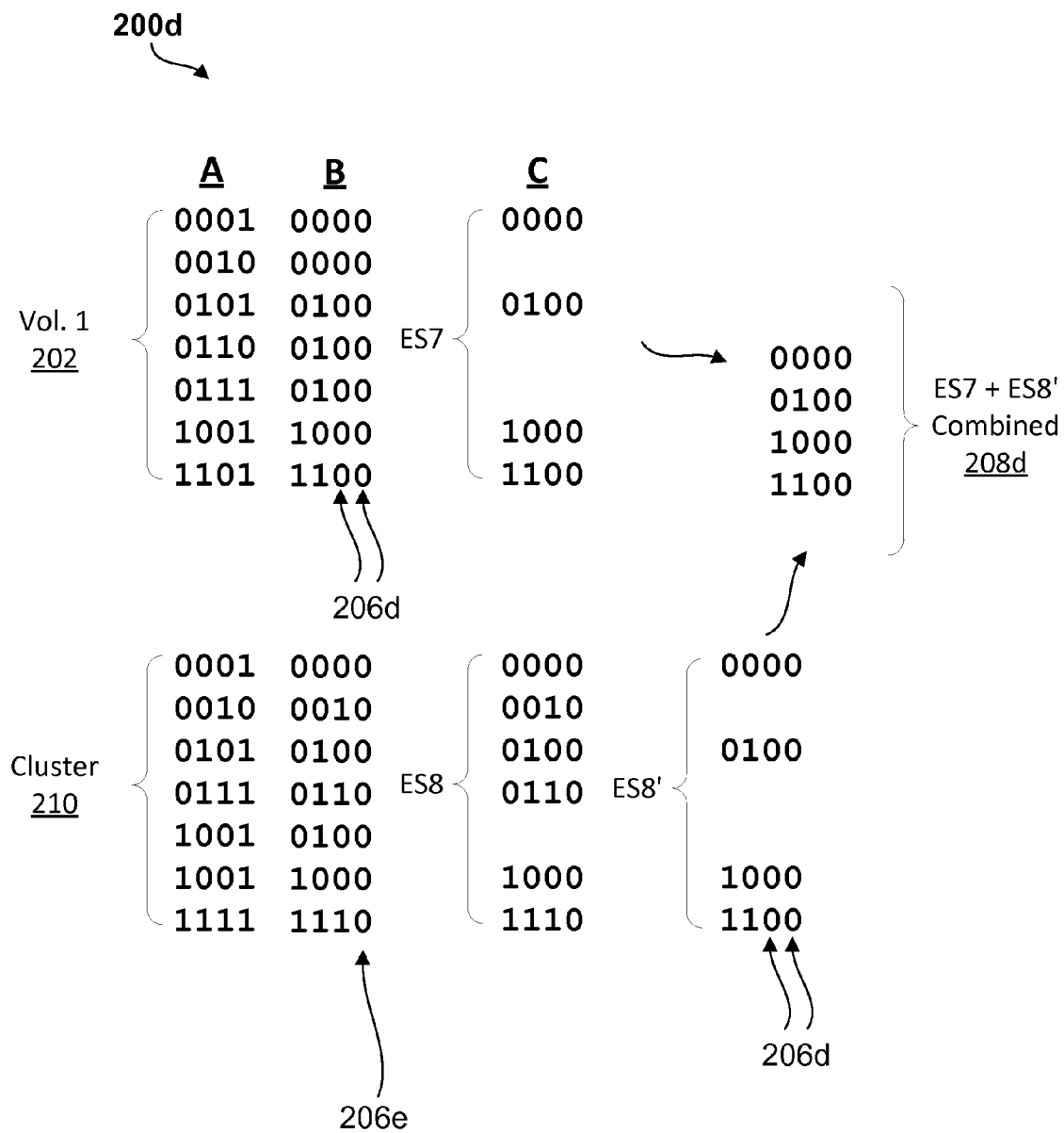
FIG. 2D depicts efficiency sets in accordance with an illustrative implementation.

Referring to FIG. 2D a diagram 200d of sample efficiency sets (ES7 and ES8) is shown in accordance with an illustrative implementation. Efficiency sets ES7 and ES8 are generated from groups of block identifiers 212 of a volume and block identifiers 210 of a cluster. In column A, the set of block identifiers 212 consists of all of the block identifiers for the volume, and the volume may be part of the storage system (e.g., storage system 100), or the volume may be external to the storage system (e.g., a volume to be imported). The set of block identifiers 210 can consist of the block identifiers of a cluster. The block identifiers of the cluster may depend on the type of operation being performed. In one embodiment, block identifiers 210 include all of the identifiers of a cluster and the volume is not part of the cluster. In this embodiment, it may be useful to compare block identifiers 212 to block identifiers 210 to estimate the effect of moving the volume on to the cluster. In another embodiment, block identifiers 210 include all of the identifiers of a cluster except for the identifiers corresponding to the volume, where the volume is already part of the cluster. In this embodiment, it may be useful to compare block identifiers 212 to block identifiers 210 to estimate the uniqueness of the volume within the cluster. As one example, based on the estimated uniqueness of the volume, an administrator can approximate the effect of removing the volume from the cluster (i.e., how much free space would be gained as a result of removing the volume from the cluster).

In column B, a bitmask 206d has been applied to block identifier group 212 such that the two least significant bits of the block identifiers are masked to become "00". Also, a separate bitmask 206e has been applied to block identifier group 210 such that the least significant bit of the block identifiers are masked to become "0". After bitmasks 206d and 206e have been applied, the resulting efficiency sets ES7 and ES8 may be seen with reference to column C. As depicted, the application of bitmask 206d to block identifiers group 212 resulted in four entries in efficiency set ES7. The application of bitmask 206e to block identifiers group 210 resulted in six entries in efficiency set ES8. ES7 and ES8 cannot yet be compared to approximate the dedupability (i.e. uniqueness) of data between the volume and the cluster data because different bitmasks 206d and 206e were applied to groups 212 and 210, respectively. The resulting efficiency sets can be normalized as to which bits were masked, prior to comparison of the efficiency sets. In one embodiment, the bitmasks are generated in a determinative manner, such that bitmasks may differ in order. Higher order bitmasks where more bits are masked can encompass lower order bitmasks where fewer bits are masked. The order of a bitmask corresponds to how many bits are masked by the bitmask. For example, a higher order bitmask may be 8 bits in length (to be applied to 8 random bits of the block identifiers), and a lower order bitmask may be 4 bits in length (to be applied to four of the eight random bits of the block identifiers of the higher order bitmask). In such an embodiment, the higher order bitmask may be retrieved (if stored) or determined from a first efficiency set, and the higher order bitmask may then be applied to a second efficiency set which originally had a lower order bitmask applied. In this manner, the second efficiency set will then have the same bitmask applied as the first efficiency set, and further analysis may be performed. In an alternative embodiment, a first efficiency set and a second efficiency set can have differing bitmasks, where bits of an arbitrary order were masked to create the first efficiency set were not masked in the second efficiency set. In this embodiment, the bit orders that were masked in the first set but not the second can be determined, and those order bits can be masked in the second efficiency set so that both sets have the same bits masked. In the example depicted in FIG. 2d, bitmasks 206d and 206e differ in order (i.e., bitmask 206d is a higher order mask that bitmask 206e). Accordingly, as bitmask 206d encompasses bitmask 206e, bitmask 206d may be applied to efficiency set ES8 to create efficiency set ES8'. In this manner, efficiency sets ES7 and ES8' each have the same bitmask applied, and efficiency sets ES7 and ES8' may then be compared as discussed herein.

The combined set 208d (the merged set of ES7 and ES8') includes four entries and there are eight total entries in ES7 and ES8' before merging. This comparison indicates that there is a fair amount of duplicated data blocks shared between the volume and the cluster, with a confidence based on bitmask 206d and the format of the block identifiers. Thus, in an embodiment where volume 1 is an external volume, an administrator can estimate that if the volume were imported to the cluster, there would be significant deduplication of data. Further, the efficiency set of the volume can be compared to any number of efficiency sets of clusters of the storage system so that the volume can be imported to the cluster with the highest estimated amount of deduplication. In an embodiment where the volume is already part of a cluster, an administrator can estimate the uniqueness of the volume in the cluster. This is useful in determining how much physical storage is used/required for the volume in the cluster. Further, the administrator can determine if it would be beneficial to move the volume to another cluster (e.g., by comparison the efficiency sets of the volume and the second cluster) and estimating the dedupability between the volume and the second cluster.

Thus, efficiency sets as discussed are useful for a variety of calculations and can be used to approximate the outcome of moving/importing data throughout a storage system. In an illustrative embodiment, an efficiency set is used to approximate the uniqueness of a volume in a cluster by comparing the efficiency set to an efficiency set for all other volumes in the cluster. For example, many volumes (e.g., volumes 1-4, etc.) may be part of a cluster. An administrator of the storage system may desire to determine how much unique data (i.e. how many unique data blocks and corresponding block identifiers) is associated with a particular volume. For example, the administrator may want to determine the uniqueness of volume 1. To do so, the efficiency set of volume 1 can be determined. The efficiency set of all the other volumes can also be determined (i.e. a combined efficiency for volumes 2-4). The efficiency set of volume 1 can then be compared to the combined efficiency set of volumes 2-4 to determine the amount of duplicate (and unique) entries between the sets. The amount of duplicate (and unique) entries between the efficiency sets approximates the uniqueness of volume 1 within the cluster. However, as efficiency sets were used, and such efficiency sets are condensed representations of a volume (due to the applied mask), the approximation of uniqueness may be determined without having the compare all of the actual block identifiers corresponding to each volume.

In another illustrative embodiment, efficiency sets may be used to determine metrics of the result of importing a volume to the storage system. For example, if a client desires to store a new volume of data in the system, an administrator (or the storage system) can determine on what cluster to store the imported volume by comparing the efficiency set of the imported volume with the efficiency set of one or more target clusters. By doing so, the approximate uniqueness of the imported volume as compared to the various target clusters can be calculated. For example, if the result of comparing the efficiency sets indicates that the imported volume contains a high percentage of unique data compared to a first cluster, and the imported volume contains a low percentage of unique data compared a second cluster, it may be desirable to import the volume to be stored on the second cluster. Since the imported volume data is not overly unique as compared to the second cluster data, a higher percentage of data blocks can be deduplicated when imported. In this manner, less overall physical storage is required to store the imported volume because a high percentage of data blocks of the imported volume are already being stored on the second cluster.

Any of the efficiency sets disclosed herein may be stored for later retrieval, may be generated on demand, or may be generated in response to a certain triggering event. In an illustrative embodiment, an efficiency set can be stored as a file (e.g., a hidden file, a configuration file, etc.) by a server of a volume (e.g., a server of metadata layer 104, block server layer 106, etc.). An efficiency set may also be stored temporarily in memory, and then may be written to disk or discarded. In another illustrative embodiment, an efficiency set may be generated in response to an administrator's request. In another illustrative embodiment, an efficiency set may be generated and stored for a volume according to a schedule. Additionally, a bitmask or an indication of bits that were masked (e.g., a formula, a bitmask function, etc.) may be stored. For example, a bitmask may be stored along with a stored efficiency set, or a bitmask may be stored separately and linked to one or more efficiency sets.

Figure 3:
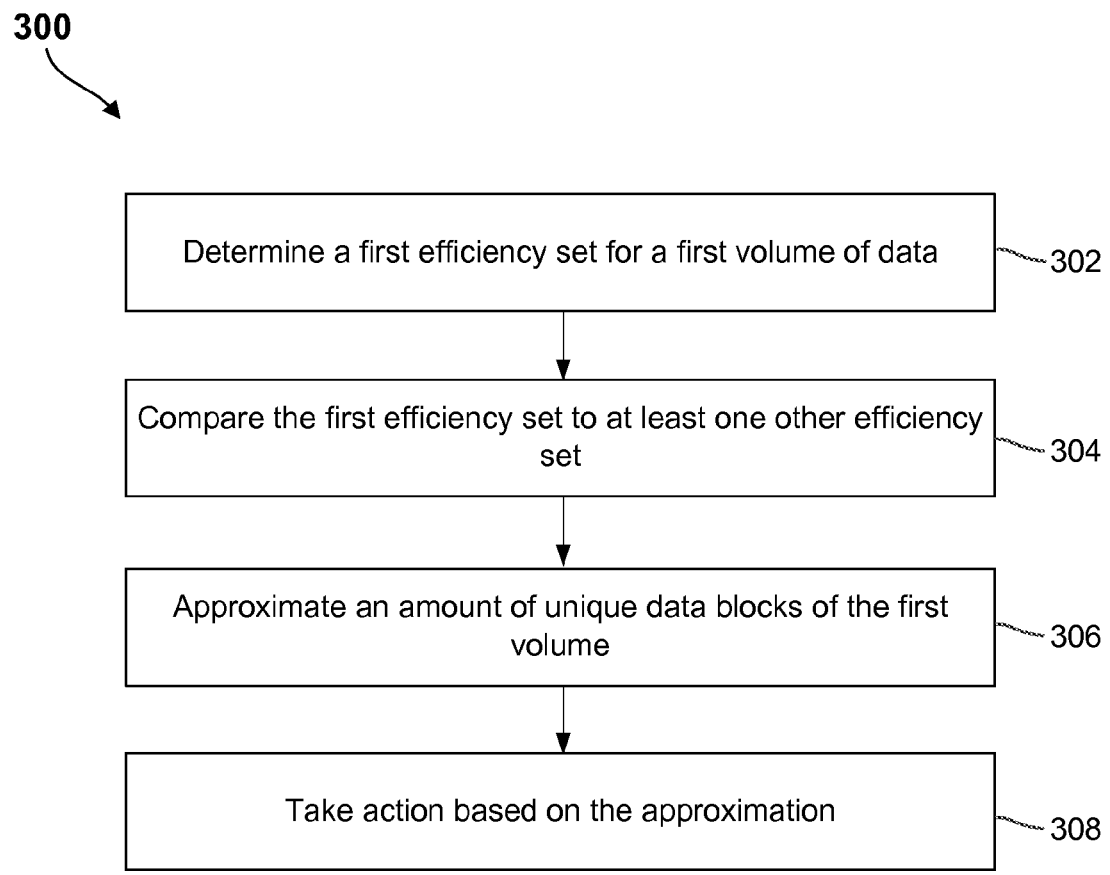
FIG. 3 shows a flow diagram for determining an efficiency set in accordance with an illustrative implementation.

FIG. 3 shows a flow diagram 300 for generating and comparing efficiency sets in accordance with an illustrative implementation. A first efficiency set can be determined for a first volume (302); the first volume may be internal or external to the storage system. To determine the efficiency set, a mask is applied to the set of block identifiers of the first volume. Any duplicate values may be removed from the set or otherwise ignored. The first efficiency set can be compared to at least one other efficiency set (which has the same mask applied) (304) to determine similarities and differences between the efficiency sets. Accordingly, it can be determined which entries of the efficiency sets are duplicative or unique between the efficiency sets (e.g., how many entries match between two or more efficiency sets after a bitmask has been applied). However, if the bitmask used for the first efficiency set differs from the bitmask used in the other efficiency set, either bitmask may be reapplied to the first or other efficiency sets so that the first and other efficiency sets will have the same masks applied. The selection of which bitmask to reapply may be based on which bitmask has the highest order. For example, a 32-bit bitmask may be retrieved or determined from the first efficiency set and then reapplied to the other efficiency set (which may have originally had a different 16-bit bitmask applied). In one embodiment, the other efficiency set is for a second volume. In another embodiment, the other efficiency set is for a cluster of volumes. In another embodiment, the first efficiency set can be compared to a plurality of other efficiency sets, each corresponding to different volumes or clusters. Based on the amount of duplicate entries between the efficiency sets an amount of unique data blocks of the first volume is approximated (306). Depending on the result, action may be taken (308). For example, a cluster on which to import or move a volume may be determined, and the volume may then be imported or moved to the appropriate cluster. As another example, the amount of physical space used by a volume on a cluster can be determined, and it can be determined whether it would be beneficial to move the volume from the cluster.

One or more flow diagrams have been used herein. The use of flow diagrams is not meant to be limiting with respect to the order of operations performed. The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

The foregoing description of illustrative implementations has been presented for purposes of illustration and of description. It is not intended to be exhaustive or limiting with respect to the precise form disclosed, and modifications and variations are possible in light of the above teachings or may be acquired from practice of the disclosed implementations. It is intended that the scope of the invention be defined by the claims appended hereto and their equivalents.

What is claimed is:

1. A storage system comprising:
    a server comprising one or more processors configured to:
        determine a first efficiency set for a first volume of data, wherein to determine the first efficiency set the one or more processors are configured to:
            select block identifiers for data blocks of the first volume, wherein each block identifier is used to access a particular data block corresponding to the first volume; and
            apply a first mask to the selected block identifiers to mask at least one bit of each selected block identifier;
        compare the first efficiency set to a second efficiency set for a second data store, wherein the second efficiency set is generated with a second mask;
        approximate, based on the comparison, an amount of unique data blocks of the first volume;
        compare the first efficiency set to a plurality of efficiency sets, wherein each of the plurality of efficiency sets corresponds to a particular cluster of the storage system and comprises masked blocked identifiers; and
        determine, based on the comparison of the first efficiency set to the plurality of efficiency sets, a cluster on which to move the first volume based upon the efficiency set that corresponds with the cluster and the first efficiency set having the maximum overlap of masked block identifiers.

2. The storage system of claim 1, wherein the second data store is a second volume of data within the storage system.

3. The storage system of claim 1, wherein the second data store is a cluster comprising multiple volumes of data within the storage system.

4. The storage system of claim 1, wherein the second data store is a second volume of data that is external to the storage system.

5. The storage system of claim 4, wherein the one or more processors are further configured to import, based on the comparison, the second volume to a cluster of the storage system in order to maximize dedupability of data of the second volume.

6. The storage system of claim 1, wherein the one or more processors are further configured to move the first volume of data on to the determined cluster.

7. The storage system of claim 1, wherein the one or more processors are further configured to:
    determine whether the first mask differs from the second mask; and
    responsive to determining that the first mask differs from the second mask, apply the first mask to block identifiers of the second efficiency set prior to comparing the first efficiency set to the second efficiency, wherein the first mask masks more bits than the second mask.

8. The storage system of claim 1, wherein each block identifier is unique, and wherein each block identifier comprises a hash of a particular data block of the storage system.

9. A method comprising:
    determining, using one or more processors, a first efficiency set for a first volume of data of a storage system, wherein determining the first efficiency set comprises:
        selecting block identifiers for data blocks of the first volume, wherein each block identifier is used to access a particular data block corresponding to the first volume; and
        applying a first mask to the selected block identifiers to mask at least one bit of each selected block identifier;
    comparing the first efficiency set to a second efficiency set for a second data store, wherein the second efficiency set is generated with a second mask;
    approximating, based on the comparison, an amount of unique data blocks of the first volume;
    comparing the first efficiency set to a plurality of efficiency sets, wherein each of the plurality of efficiency sets corresponds to a particular cluster of the storage system and comprises masked blocked identifiers; and
    determining, based on the comparison of the first efficiency set to the plurality of efficiency sets, a cluster on which to move the first volume based upon the efficiency set that corresponds with the cluster and the first efficiency set having the maximum overlap of masked block identifiers.

10. The method of claim 9, wherein the second data store is a second volume of data within the storage system.

11. The method of claim 9, wherein the second data store is a cluster comprising multiple volumes of data within the storage system.

12. The method of claim 9, wherein the second data store is a second volume of data that is external to the storage system.

13. The method of claim 12, further comprising importing, based on the comparison, the second volume to a cluster of the storage system in order to maximize dedupability of data of the second volume.

14. The method of claim 9, further comprising moving the first volume of data on to the determined cluster.

15. The method of claim 9, further comprising:
determining whether the first mask differs from the second mask; and
responsive to determining that the first mask differs from the second mask, applying the first mask to block identifiers of the second efficiency set prior to comparing the first efficiency set to the second efficiency, wherein the first mask masks more bits than the second mask.

16. The method of claim 9, wherein each block identifier is unique, and wherein each block identifier comprises a hash of a particular data block of the storage system.

17. A non-transitory computer-readable medium having instructions stored thereon, that when executed by a computing device cause the computing device to perform operations comprising:
determining a first efficiency set for a first volume of data of a storage system, wherein determining the first efficiency set comprises:
selecting block identifiers for data blocks of the first volume, wherein each block identifier is used to access a particular data block corresponding to the first volume; and
applying a first mask to the selected block identifiers to mask at least one bit of each selected block identifier;
comparing the first efficiency set to a second efficiency set for a second data store;
approximating, based on the comparison, an amount of unique data blocks of the first volume;
comparing the first efficiency set to a plurality of efficiency sets, wherein each of the plurality of efficiency sets corresponds to a particular cluster of the storage system and comprises masked blocked identifiers; and
determining, based on the comparison of the first efficiency set to the plurality of efficiency sets, a cluster on which to move the first volume based upon the efficiency set that corresponds with the cluster and the first efficiency set having the maximum overlap of masked block identifiers in order to maximize dedupability of data of the first volume in the storage system.

18. The non-transitory computer-readable medium of claim 17, wherein each block identifier is unique, and wherein each block identifier comprises a hash of a particular data block of the storage system.

19. The non-transitory computer-readable medium of claim 17, wherein the second data store is a second volume of data within the storage system.

20. The non-transitory computer-readable medium of claim 17, wherein the second data store is a cluster comprising multiple volumes of data within the storage system.

* * * * *